US012790414B2

(12) United States Patent
Tsukahara et al.

(10) Patent No.: US 12,790,414 B2
(45) Date of Patent: Nov. 10, 2026

(54) REACTIVE EMULSIFIER-CONTAINING COMPOSITION AND METHOD OF STORING REACTIVE EMULSIFIER

(71) Applicant: ADEKA CORPORATION, Tokyo (JP)

(72) Inventors: Naoki Tsukahara, Tokyo (JP); Satoshi Inoue, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 315 days.

(21) Appl. No.: 18/836,141

(22) PCT Filed: Feb. 8, 2023

(86) PCT No.: PCT/JP2023/004153

§ 371 (c)(1),
(2) Date: Aug. 6, 2024

(87) PCT Pub. No.: WO2023/153425

PCT Pub. Date: Aug. 17, 2023

(65) Prior Publication Data

US 2025/0197540 A1 Jun. 19, 2025

(30) Foreign Application Priority Data

Feb. 9, 2022 (JP) ................................ 2022-018343

(51) Int. Cl.

| | |
|---|---|
| ***C08F 16/30*** | (2006.01) |
| ***A01N 25/04*** | (2006.01) |
| ***A01P 1/00*** | (2006.01) |
| ***C09D 5/02*** | (2006.01) |
| ***C09D 7/45*** | (2018.01) |
| ***C09D 7/65*** | (2018.01) |

(52) U.S. Cl.

CPC .............. *C08F 16/30* (2013.01); *A01N 25/04* (2013.01); *A01P 1/00* (2021.08); *C09D 5/022* (2013.01); *C09D 5/025* (2013.01); *C09D 5/027* (2013.01); *C09D 7/45* (2018.01); *C09D 7/65* (2018.01)

(58) Field of Classification Search

None

See application file for complete search history.

(56) References Cited

U.S. PATENT DOCUMENTS

| | | | |
|---|---|---|---|
| 7,799,859 B2 * | 9/2010 | Kobayashi | C09K 23/16<br>524/460 |
| 2019/0217265 A1 * | 7/2019 | Joyabu | C08F 2/24 |
| 2020/0010593 A1 * | 1/2020 | Hsu | C09K 8/887 |

FOREIGN PATENT DOCUMENTS

| | | | |
|---|---|---|---|
| EP | 1 369 434 | 12/2003 | |
| JP | 63-54927 | 3/1988 | |
| JP | 63-77530 | 4/1988 | |
| JP | 63-185436 | 8/1988 | |
| JP | 63-319035 | 12/1988 | |
| JP | 5-98190 | 4/1993 | |
| JP | 10-120712 | 5/1998 | |
| JP | 2002-301353 | 10/2002 | |
| JP | 2003-226793 | 8/2003 | |
| JP | 2006-75808 | 3/2006 | |
| JP | 2009-298732 | 12/2009 | |
| JP | 5469871 | 4/2014 | |
| JP | 2019-072998 | 5/2019 | |
| WO | 02/057320 | 7/2002 | |
| WO | 2006/030717 | 3/2006 | |
| WO | 2009/133827 | 11/2009 | |
| WO | WO-2015194611 A1 * | 12/2015 | B32B 25/08 |

OTHER PUBLICATIONS

WO-2015194611-A1, English translation (Year: 2015).*
Extended European Search Report issued Jan. 28, 2026 in corresponding European Patent Application No. 23752889.8.
International Search Report issued Apr. 4, 2023 in International Application No. PCT/JP2023/004153.

* cited by examiner

*Primary Examiner* — Stefanie J Cohen

(74) *Attorney, Agent, or Firm* — Wenderoth, Lind & Ponack, L.L.P.

(57) ABSTRACT

Disclosed herein are a reactive emulsifier-containing composition, including: a reactive emulsifier represented by the following general formula (1); and water, wherein a content of the reactive emulsifier represented by the general formula (1) in the reactive emulsifier-containing composition is from 60 mass % to 98 mass %, and a method of storing the reactive emulsifier:

(1)

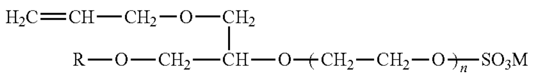

where R represents a hydrocarbon group having 8 to 20 carbon atoms, "n" represents a number from 5 to 50, and M represents a hydrogen atom, an alkali metal atom, or an ammonium group.

6 Claims, No Drawings

REACTIVE EMULSIFIER-CONTAINING COMPOSITION AND METHOD OF STORING REACTIVE EMULSIFIER

TECHNICAL FIELD

The present invention relates to a reactive emulsifier-containing composition excellent in pH stability and antiseptic property, and to a method of storing a reactive emulsifier for maintaining its excellent pH stability and antiseptic property.

BACKGROUND ART

A resin emulsion of, for example, an acrylic resin or a styrene-based resin is used for a paint, an adhesive, a pressure-sensitive adhesive, a coating agent, an ink, a cement, a mortar, a car wax, or the like. In order to improve various characteristics of the resin emulsion, there is given a method involving using a reactive emulsifier when the resin emulsion is produced by subjecting a raw material monomer to emulsion polymerization, and various reactive emulsifiers have hitherto been proposed.

As the reactive emulsifier, there have been known, for example, various reactive emulsifiers each having a (meth) allyl ether group as a reactive group (Patent Documents 1 and 2) and various reactive emulsifiers each having a (meth)acrylic acid ester group as a reactive group (Patent Documents 3 and 4). In addition, reactive emulsifiers each having an allyl ether group and a sulfone group have also been known (Patent Documents 5 to 8). Those reactive emulsifiers have been widely used in the production of various resin emulsions.

However, it has been found that, out of such reactive emulsifiers, the reactive emulsifier having an allyl ether group and a sulfone group has the following risk. That is, when the reactive emulsifier is left to stand still in a state of a compound alone or a state of an aqueous solution except for a specific concentration, its characteristics as a reactive emulsifier deteriorate through long-term storage, for example, a change in pH and proliferation of microorganisms in the composition occur in accordance with long-term storage, because the reactive emulsifier is poor in pH stability and/or antiseptic property. In view of the foregoing, in order to eliminate such concern, there have been required a reactive emulsifier-containing composition that is excellent in pH stability and antiseptic property, and can be stably stored for a long period of time, and a method of stably storing a reactive emulsifier.

CITATION LIST

Patent Document

[Patent Document 1] JP S63-054927 A
[Patent Document 2] JP S63-319035 A
[Patent Document 3] JP S63-077530 A
[Patent Document 4] JP S63-185436 A
[Patent Document 5] JP 2002-301353 A
[Patent Document 6] JP 2006-075808 A
[Patent Document 7] WO 2009/133827 A1
[Patent Document 8] JP H05-098190 A

SUMMARY OF INVENTION

Technical Problem

Thus, the present invention has an object to provide a reactive emulsifier-containing composition excellent in pH stability and antiseptic property, and a method of storing a reactive emulsifier for maintaining its excellent pH stability and antiseptic property.

Solution to Problem

The inventors of the present invention have made extensive investigations in order to achieve the above-mentioned object, and as a result, have found that a specific reactive emulsifier-containing composition comprising a specific reactive emulsifier and water at a specific ratio is excellent in pH stability and antiseptic property, and hence the specific reactive emulsifier can be stably stored for a long period of time without any concern about deterioration of its characteristics. Thus, the inventors have reached the present invention. That is, according to an embodiment of the present invention, there is provided a reactive emulsifier-containing composition, comprising: a reactive emulsifier represented by the following general formula (1); and water, wherein a content of the reactive emulsifier represented by the general formula (1) in the reactive emulsifier-containing composition is from 60 mass % to 98 mass %:

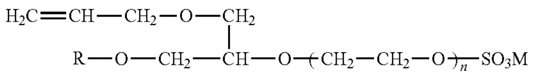

(1)

where R represents a hydrocarbon group having 8 to 20 carbon atoms, "n" represents a number from 5 to 50, and M represents a hydrogen atom, an alkali metal atom, or an ammonium group.

Advantageous Effects of Invention

The reactive emulsifier-containing composition according to the present invention is excellent in pH stability and antiseptic property. Accordingly, the specific reactive emulsifier can be stably stored for a long period of time without any concern about deterioration of its characteristics.

DESCRIPTION OF EMBODIMENTS

A reactive emulsifier in a reactive emulsifier-containing composition of the present invention is represented by the following general formula (1):

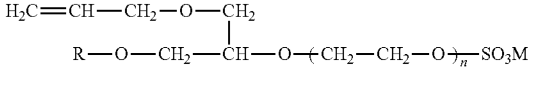

(1)

where R represents a hydrocarbon group having 8 to 20 carbon atoms, "n" represents a number from 5 to 50, and M represents a hydrogen atom, an alkali metal atom, or an ammonium group.

R in the general formula (1) represents a hydrocarbon group having 8 to 20 carbon atoms, and examples of such group include: a linear or branched alkyl group, such as an octyl group, a branched octyl group, a nonyl group, a branched nonyl group, a decyl group, a branched decyl group, an undecyl group, a branched undecyl group, a dodecyl group, a branched dodecyl group, a tridecyl group, a branched tridecyl group, a tetradecyl group, a branched tetradecyl group, a pentadecyl group, a branched pentadecyl group, a hexadecyl group, a branched hexadecyl group, a heptadecyl group, a branched heptadecyl group, a stearyl group, a branched stearyl group, an eicosyl group, or a branched eicosyl group; a linear or branched alkenyl group, such as an octenyl group, a decenyl group, a dodecenyl group, a tetradecenyl group, an oleyl group, or a linoleyl group; and a substituted or unsubstituted aryl group, such as a hexylphenyl group, a heptylphenyl group, an octylphenyl group, a nonylphenyl group, a decylphenyl group, an undecylphenyl group, a dodecylphenyl group, or a nonylphenyl group. In particular, R in the general formula (1) preferably represents a hydrocarbon group having 10 to 16 carbon atoms, more preferably represents a branched alkyl group having 10 to 16 carbon atoms or an aryl group having 12 to 16 carbon atoms, and still more preferably represents a branched alkyl group having 11 to 14 carbon atoms or an aryl group having 14 to 16 carbon atoms from the viewpoint that a reactive emulsifier-containing composition more excellent in pH stability and antiseptic property is obtained by adopting the configuration of the present invention. Specifically, R preferably represents an isoundecyl group, a dodecyl group, an isotridecyl group, a tetradecyl group, or a nonylphenyl group.

"n" in the general formula (1) represents a number from 5 to 50. In particular, "n" in the general formula (1) preferably represents from 10 to 40, and more preferably represents from 10 to 30 from the viewpoint that a reactive emulsifier-containing composition more excellent in pH stability and antiseptic property is obtained by adopting the configuration of the present invention.

In addition, the average of values for "n" is preferably from 8 to 45, more preferably from 10 to 40, still more preferably from 10 to 30.

In the general formula (1), M represents a hydrogen atom, an alkali metal atom, or an ammonium group. Examples of the alkali metal atom include a lithium atom, a sodium atom, and a potassium atom. In particular, M in the general formula (1) preferably represents a hydrogen atom, a sodium atom, a potassium atom, or an ammonium group, and more preferably represents an ammonium group from the viewpoint that a reactive emulsifier-containing composition more excellent in pH stability and antiseptic property is obtained by adopting the configuration of the present invention.

A method of producing the compound represented by the general formula (1) is not particularly limited, and the compound may be produced by a known method. For example, the compound may be produced by the method described in JP 2002-301353 A or the method described in JP 2006-75808 A. Specifically, the production may be performed by, for example, adding ethylene oxide to a reaction product of a glycidyl ether having an allyl group and an aliphatic alcohol having 8 to 20 carbon atoms, followed by sulfuric acid esterification with, for example, sulfamic acid, sulfuric acid, sulfuric anhydride, or chlorosulfonic acid, and neutralization with, for example, an alkali metal hydroxide or ammonia as required.

The reaction conditions for the reaction of the glycidyl ether having an allyl group and the aliphatic alcohol having 8 to 20 carbon atoms are not particularly limited, and a known method may be used. There may be used, for example, a method involving a reaction under an environment at from room temperature to 150° C. and a pressure of from 0.01 MPa to 1 MPa using a catalyst, such as a tertiary amine, a quaternary ammonium salt, boron trifluoride or an ether complex salt thereof, aluminum chloride, barium oxide, sodium hydroxide, or potassium hydroxide, as required.

The reaction conditions for adding ethylene oxide to the reaction product of the glycidyl ether having an allyl group and the aliphatic alcohol having 8 to 20 carbon atoms are not particularly limited, and a known method may be used. There may be used, for example, a method involving a reaction under an environment at from room temperature to 150° C. and a pressure of from 0.01 MPa to 1 MPa using sodium hydroxide, potassium hydroxide, boron trifluoride, or the like as a catalyst as required.

The reaction conditions for the esterification with, for example, sulfamic acid, sulfuric acid, sulfuric anhydride, or chlorosulfonic acid described above are not particularly limited, and a known method may be used. There may be used, for example, a method involving a reaction for about 1 hour to about 10 hours under an environment at from room temperature to 150° C. and from normal pressure to 1 MPa.

In addition, in the method of producing the compound represented by the general formula (1), the compound may be produced by using water or an organic solvent, such as methanol, ethanol, propanol, isopropanol, butanol, benzene, toluene, or hexane, as required.

The reactive emulsifier-containing composition of the present invention may be a mixture containing, as reactive emulsifiers, a plurality of kinds of compounds each represented by the general formula (1) in which Rs represent different hydrocarbon groups, and may be a mixture containing two kinds of compounds each represented by the general formula (1) in which Rs represent different hydrocarbon groups. When a mixture containing, as reactive emulsifiers, only two kinds of compounds each represented by the general formula (1) in which R represents a hydrocarbon group A or a hydrocarbon group B is adopted, the ratio of the compound in which R represents the hydrocarbon group B is from preferably 0.1 mol to 10 mol, more preferably from 0.3 mol to 5 mol, still more preferably from 0.5 mol to 3 mol, even still more preferably from 0.8 mol to 1.5 mol, most preferably from 0.8 mol to 1.2 mol with respect to 1 mol of the compound in which R represents the hydrocarbon group A. For example, the ratio of the compound represented by the general formula (1) in which R represents the hydrocarbon group B is preferably 1 mol with respect to 1 mol of the compound represented by the general formula (1) in which R represents the hydrocarbon group A.

In addition, in one embodiment mode of the present invention, when the mixture containing only two kinds of compounds each represented by the general formula (1) as reactive emulsifiers is used, R in one of the compounds may represent an isoundecyl group, and R in the other compound may represent an isotridecyl group. In addition, as another embodiment mode of the present invention, R in one of the compounds may represent a dodecyl group, and R in the other compound may represent a tetradecyl group.

The reactive emulsifier-containing composition of the present invention is a reactive emulsifier-containing composition comprising the reactive emulsifier represented by the general formula (1) described above and water, wherein the content of the reactive emulsifier represented by the general formula (1) in the reactive emulsifier-containing composition is from 60 mass % to 98 mass %. The water to be used in the present invention is not particularly limited, and there may be used, for example, tap water, ion-exchanged water, distilled water, natural water, or pure water. In the present invention, the content of the reactive emulsifier represented by the general formula (1) in the reactive emulsifier-containing composition is preferably from 70 mass % to 98 mass %, more preferably from 80 mass % to 96 mass %, still more preferably from 85 mass % to 96 mass % from the viewpoint that a reactive emulsifier-containing composition more excellent in pH stability and antiseptic property is obtained.

The content of the reactive emulsifier represented by the general formula (1) in the reactive emulsifier-containing composition is represented in terms of ratio (percentage) of the reactive emulsifier represented by the general formula (1) with respect to the total mass of the reactive emulsifier-containing composition.

In the present invention, the content of the water in the reactive emulsifier-containing composition may be appropriately adjusted in accordance with purposes. The content of the water in the reactive emulsifier-containing composition is preferably from 2 mass % to 40 mass %, more preferably from 2 mass % to 30 mass %, still more preferably from 4 mass % to 20 mass %, particularly preferably from 4 mass % to 15 mass % from the viewpoint that a reactive emulsifier-containing composition more excellent in pH stability and antiseptic property is obtained.

The content of water in the reactive emulsifier-containing composition is represented in terms of ratio (percentage) of the water with respect to the total mass of the reactive emulsifier-containing composition.

In the present invention, the ratio between the content of the reactive emulsifier represented by the general formula (1) in the reactive emulsifier-containing composition and the content of the water therein may be appropriately adjusted in accordance with purposes. The mass ratio between the content of the reactive emulsifier represented by the general formula (1) in the reactive emulsifier-containing composition and the content of the water therein is preferably from 60:40 to 98:2, more preferably from 70:30 to 98:2, still more preferably from 80:20 to 96:4, particularly preferably from 85:15 to 96:4 from the viewpoint that a reactive emulsifier-containing composition more excellent in pH stability and antiseptic property is obtained.

The reactive emulsifier-containing composition of the present invention may comprise other components as long as the effects of the present invention are not impaired. Examples of such other components include: a surfactant, such as an anionic surfactant, a nonionic surfactant, an amphoteric surfactant, or a cationic surfactant (excluding the reactive emulsifier represented by the general formula (1)); an organic solvent; a plasticizer; an antiseptic; a thickener; and a dispersant. Examples of the anionic surfactant include a fatty acid soap, a higher alcohol sulfate ester salt, a sulfurized olefin salt, a higher alkyl sulfonate salt, an α-olefin sulfonate salt, a sulfated fatty acid salt, a sulfonated fatty acid salt, a phosphate ester salt, a sulfate ester salt of a fatty acid ester, a glyceride sulfate ester salt, a sulfonate salt of a fatty acid ester, α-sulfo fatty acid methyl ester salt, a polyoxyalkylene alkyl ether sulfate ester salt, a polyoxyethylene alkyl phenyl ether sulfate ester salt, a sulfate ester salt of an alkylene oxide adduct of a 1 fatty acid alkanolamide, a sulfosuccinic acid ester, an alkylbenzene sulfonate salt, an alkylnaphthalene sulfonate salt, an alkylbenzimidazole sulfonate salt, an N-acyl-N-methyltaurine salt, an acyloxyethane sulfonate salt, an alkoxyethane sulfonic acid, an N-acyl-N-carboxyethyltaurine or a salt thereof, and an alkyl or alkenylaminocarboxymethyl sulfate salt.

Examples of the nonionic surfactant include a polyoxyethylene alkyl ether, a polyoxyethylene alkyl phenyl ether, a glycerin fatty acid ester, a polyglyceryl fatty acid ester, a sorbitan fatty acid ester, a polyoxyethylene fatty acid ester, a polyoxyethylene sorbitan fatty acid ester, a polyoxyethylene alkylamine, polyoxyethylene-polyoxypropylene ethylenediamine, a polyoxyethylene alkylamide, a polyoxyethylene castor oil, a polyoxyethylene hydrogenated castor oil, a polyoxyethylene rosin ester, a polyoxyethylene lanolin ether, an acetylene glycol ethylene oxide adduct, and a copolymer of two or more kinds of alkylene oxides such as an ethylene oxide-propylene oxide block copolymer.

Examples of the amphoteric surfactant include: an alkylbetaine-type amphoteric surfactant, such as an alkyldimethylbetaine or an alkyldihydroxyethylbetaine; an imidazolium betaine-type amphoteric surfactant, such as an N-fatty acid acyl-N-carboxymethyl-N-hydroxyethylethylenediamine salt or an N-fatty acid acyl-N-carboxyethyl-N-hydroxyethylethylenediamime salt; an amidopropyl betaine-type amphoteric surfactant such as a fatty acid amidopropyl betaine; and an amino acid-type amphoteric surfactant, such as an alkylaminopropionate salt or an alkylaminodipropionate salt.

Examples of the cationic surfactant include an alkyl (alkenyl) trimethylammonium salt, dialkyl(alkenyl) dimethylammonium salt, an alkyl(alkenyl) quaternary ammonium salt, a mono- or di-alkyl(alkenyl) quaternary ammonium salt containing an ether group, an ester group, or an amide group, an alkyl(alkenyl) pyridinium salt, an alkyl(alkenyl) dimethylbenzylammonium salt, an alkyl(alkenyl) isoquinolinium salt, a dialkyl(alkenyl) morphonium salt, an alkyl(alkenyl) amine salt, benzalkonium chloride, and benzethonium chloride, Examples of the organic solvent include: ketones, such as methyl ethyl ketone, methyl amyl ketone, diethyl ketone, acetone, methyl isopropyl ketone, methyl isobutyl ketone, cyclohexanone, and 2-heptanone; an ether-based solvent, such as ethyl ether, dioxane, tetrahydrofuran, 1,2-dimethoxyethane, 1,2-diethoxyethane, or dipropylene glycol dimethyl ether; an ester-based solvent, such as methyl acetate, ethyl acetate, n-propyl acetate, isopropyl acetate, n-butyl acetate, cyclohexyl acetate, ethyl lactate, or dimethyl succinate; a cellosolve-based solvent, such as ethylene glycol monomethyl ether or ethylene glycol monoethyl ether; an alcohol-based solvent, such as methanol, ethanol, propanol, butanol, or amyl alcohol; an ether ester-based solvent, such as ethylene glycol monomethyl acetate, ethylene glycol monoethyl acetate, propylene glycol-1-monomethyl ether, propylene glycol-1-monomethyl ether-2-acetate, dipropylene glycol monomethyl ether acetate, 3-methoxybutyl acetate, or ethoxyethyl propionate; a BTX-based solvent, such as benzene, toluene, or xylene; an aliphatic hydrocarbon-based solvent, such as hexane, heptane, octane, or cyclohexane; a terpene-based hydrocarbon oil, a paraffin-based solvent, a carbitol-based solvent, aniline, triethylamine, pyridine, acetic acid, acetonitrile, carbon disulfide, N,N-dimethylformamide, N,N-dimethylacetamide, N-methylpyrrolidone, and dimethylsulfoxide.

Examples of the plasticizer include adipate esters, fumarate esters, sebacate esters, citrate esters, maleate esters, phosphate esters, epoxy fatty acid esters, aliphatic dibasic acid esters, sulfonamides, fatty acid amides, polyesters, and chlorinated paraffins.

Examples of the antiseptic include paraben, methylparaben, benzoate, benzyl alcohol, isothiazolone, isothiazolinone, phenoxyethanol, phenylethanol, alkanediols, alkylglyceryl ethers, a triazine-based compound, benzoic acid, a benzoate salt, salicylic acid, a salicylate salt, a quaternary ammonium salt-based compound, a halogenated compound, a cyclic organic nitrogen compound, sodium bisulfite, sodium bisulfate, sodium thiosulfate, an ascorbate salt, thimerosal, bronopol, thiabendazole, zinc pyrithione, carbendazim, and a pyridine oxide thiol sodium salt. In the present invention, the reactive emulsifier-containing composition has an excellent antiseptic property. Thus, the composition can be stably stored for a long period of time without blending of the antiseptic, and from the viewpoint of safety or the like during or after use, the composition is preferably free of the antiseptic.

Examples of the thickener include carrageenan, xanthan gum, guar gum, locust bean gum, ghatti gum, karaya gum, pectin, methylcellulose, ethylcellulose, hydroxypropylcellulose, hydroxyethylcellulose, hydroxyethylmethylcellulose, hydroxypropylmethylcellulose, carboxymethylcellulose, polyacrylic acid, a polyacrylic acid-maleic acid copolymer, polyvinyl alcohol, and a carboxyvinyl polymer.

Examples of the dispersant include polyacrylic acid, polymethacrylic acid, polymaleic acid, polyitaconic acid, an acrylic acid-methacrylic acid copolymer, an acrylic acid-maleic acid copolymer, an olefin-maleic acid copolymer, an acrylic acid-sulfonic acid copolymer, a maleic anhydride-styrene copolymer, a maleic anhydride-ethylene copolymer, a maleic anhydride-vinyl acetate copolymer, a maleic anhydride-acrylic acid ester copolymer, and salts thereof.

In the present invention, the content of the other components described above is preferably from 0 mass % to 20 mass %, more preferably from 0 mass % to 10 mass %, still more preferably from 0 mass % to 3 mass % in total with respect to the total mass of the reactive emulsifier-containing composition, and it is particularly preferred that the composition be free of the other components (that is, the reactive emulsifier-containing composition consist of the reactive emulsifier represented by the general formula (1) and the water), from the viewpoint that a reactive emulsifier-containing composition that is excellent in pH stability and antiseptic property and can be stably stored for a long period of time is obtained.

The reactive emulsifier-containing composition of the present invention may be used in various applications in which a reactive emulsifier has been used. The composition may be used for, for example, an emulsifier for emulsion polymerization, a dispersant for suspension polymerization, a modifier (e.g., modifier for water repellency improvement, hydrophilicity adjustment, compatibility improvement, antistatic property improvement, antifogging property improvement, water resistance improvement, adhesive property improvement, dyeability improvement, film formation property improvement, weatherability improvement, or blocking resistance improvement) for a resin, a fiber processing aid, or a fiber antifouling processing agent. In addition, when the reactive emulsifier-containing composition of the present invention is used as an emulsifier for emulsion polymerization, its specific product field is also not limited, and the composition may be used as an emulsifier for emulsion polymerization for producing an emulsion polymer to be used for a paint, an adhesive, a pressure-sensitive adhesive, an ink, a film, a coating agent, a paper coating agent, a sizing agent, a sealer, or the like.

When the reactive emulsifier-containing composition of the present invention is used as an emulsifier for emulsion polymerization, a raw material monomer for the emulsion polymer is not particularly limited, and may be appropriately selected in accordance with purposes, Examples of the raw material monomer include an acrylate-based monomer, a styrene-based monomer, a vinyl acetate-based monomer, a butadiene-based monomer, an isoprene-based monomer, and an acrylonitrile-based monomer. More specifically, the reactive emulsifier-containing composition of the present invention may be used as an emulsifier for emulsion polymerization for producing an emulsion polymer, such as an acrylate-based emulsion, a styrene-based emulsion, a vinyl acetate-based emulsion, a styrene/butadiene (SBR) emulsion, an acrylonitrile/butadiene/styrene (ABS) emulsion, a butadiene (BR) emulsion, an isoprene (IR) emulsion, or an acrylonitrile/butadiene (NBR) emulsion.

Examples of the acrylate-based emulsion include a combination of two or more kinds of (meth)acrylic acids (esters), (meth)acrylic acid (ester)/styrene, (meth)acrylic acid (ester)/vinyl acetate, (meth)acrylic acid (ester)/acrylonitrile, (meth) acrylic acid (ester)/butadiene, (meth)acrylic acid (ester)/vinylidene chloride, (meth)acrylic acid (ester)/allylamine, (meth)acrylic acid (ester)/vinylpyridine, (meth)acrylic acid (ester)/alkylolamide, (meth)acrylic acid (ester)/N,N-dimethylaminoethyl ester, (meth)acrylic acid (ester)/N,N-diethylaminoethyl vinyl ether, and cyclohexyl methacrylate.

Examples of the styrene-based emulsion include styrene alone, styrene/acrylonitrile, styrene/butadiene, styrene/fumaronitrile, styrene/maleinitrile, styrene/cyanoacrylate ester, styrene/phenylvinyl acetate, styrene/chloromethylstyrene, styrene/dichlorostyrene, styrene/vinylcarbazole, styrene/N,N-diphenylacrylamide, styrene/methylstyrene, acrylonitrile/butadiene/styrene, styrene/acrylonitrile/methylstyrene, styrene/acrylonitrile/vinylcarbazole, and styrene/maleic acid.

Examples of the vinyl acetate-based emulsion include vinyl acetate alone, vinyl acetate/styrene, vinyl acetate/vinyl chloride, vinyl acetate/acrylonitrile, vinyl acetate/maleic acid (ester), vinyl acetate/fumaric acid (ester), vinyl acetate/ethylene, vinyl acetate/propylene, vinyl acetate/isobutylene, vinyl acetate/vinylidene chloride, vinyl acetate/cyclopentadiene, vinyl acetate/crotonic acid, vinyl acetate/acrolein, and vinyl acetate/alkyl vinyl ether.

When the reactive emulsifier-containing composition of the present invention is used for various applications, the usage amount of the reactive emulsifier-containing composition is not particularly limited, and may be appropriately adjusted in accordance with purposes. When the reactive emulsifier-containing composition of the present invention is used as, for the example, the emulsifier for emulsion polymerization, composition is preferably used in such an amount that the mass of the reactive emulsifier represented by the general formula (1) with respect to 100 parts by mass of a raw material monomer for an emulsion polymer becomes from 0.1 part by mass to 20 parts by mass, is more preferably used in such an amount that the mass becomes from 0.2 part by mass to 10 parts by mass, and is still more preferably used in such an amount that the mass becomes from 0.5 part by mass to 8 parts by mass.

A method of storing the reactive emulsifier represented by the general formula (1) of the present invention comprises mixing the reactive emulsifier represented by the general formula (1) with water and then leaving the mixture to stand still, wherein the content of the reactive emulsifier in reactive emulsifier-containing composition comprising the reactive emulsifier and the water is from 60 mass % to 98 mass %:

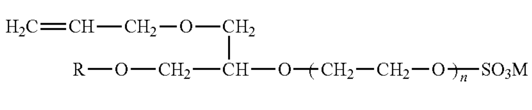

(1)

where R represents a hydrocarbon group having 8 to 20 carbon atoms, "n" represents a number from 5 to 50, and M represents a hydrogen atom, an alkali metal atom, or an ammonium group.

A reactive emulsifier and water that may be used for the above-mentioned reactive emulsifier-containing composition may be used as the reactive emulsifier represented by the general formula (1) and the water to be used in the present invention, respectively. In the present invention, a method of mixing the reactive emulsifier represented by the general formula (1) and the water is not particularly limited, and there may be used, for example, a mixing method involving manual stirring with a spatula at from normal temperature to 80° C., or a mixing method involving stirring with, for example, a roll mill, a homomixer, a homogenizer, or a disper. In the present invention, the reactive emulsifier represented by the general formula (1) can be stably stored for a long period of time without any concern about deterioration of its characteristics by: mixing the reactive emulsifier represented by the general formula (1) with the water to prepare a reactive emulsifier-containing composition in which the content of the reactive emulsifier with respect to the total mass of the reactive emulsifier-containing composition is from 60 mass % to 90 mass %; and then leaving the composition to stand still.

In the present invention, when the reactive emulsifier represented by the general formula (1) is mixed with the water at such a mass ratio that the content of the reactive emulsifier becomes from 60 mass % to 98 masse to prepare a reactive emulsifier-containing composition, and the composition is then left to stand still, conditions for the still standing are not particularly limited. When the composition is left to stand still under the environment of, for example, refrigeration, room temperature, or heating at from 0° C. to 60° C., and an environment of a humidity of from 0% RH to 99% RH, the reactive emulsifier represented by the general formula (1) can be stored without any concern about deterioration of its characteristics even after storage for a long period of time (e.g., 1 week or more, preferably 1 month or more).

EXAMPLES

The present invention is more specifically described below by way of Examples. In Examples below, the term "%" is on a mass basis unless otherwise stated. Respective components used in the Examples and the Comparative Examples are described below and shown in table 1.

<Reactive Emulsifier>

Reactive emulsifier 1: a mixture of a reactive emulsifier 1a represented by the general formula (1) in which "n" represents 10, M represents an ammonium group, and R represents an isoundecyl group, and a reactive emulsifier 1b represented by the general formula (1) in which "n" represents 10, M represents an ammonium group, and R represents an isotridecyl group (molar ratio between 1a and 1b: 50:50)

Reactive emulsifier 2: a mixture of a reactive emulsifier 2a represented by the general formula (1) in which "n" represents 20, M represents an ammonium group, and R represents an isoundecyl group, and a reactive emulsifier 2b represented by the general formula (1) in which "n" represents 20, M represents an ammonium group, and R represents an isotridecyl group (molar ratio between 2a and 2b: 50:50)

Reactive emulsifier 3; a mixture of a reactive emulsifier 3a represented by the general formula (1) in which "n" represents 30, M represents an ammonium group, and R represents an isoundecyl group, and a reactive emulsifier 3b represented by the general formula (1) in which "n" represents 30, M represents an ammonium group, and R represents an isotridecyl group (molar ratio between 3a and 3b: 50:50)

Reactive emulsifier 4: a reactive emulsifier represented by the general formula (1) in which "n" represents 10, M represents an ammonium group, and R represents a nonylphenyl group Reactive emulsifier 5: a mixture of a reactive emulsifier 5a represented by the general formula (1) in which "n" represents 10, M represents an ammonium group, and R represents a dodecyl group, and a reactive emulsifier 5b represented by the general formula (1) in which "n" represents 10, M represents an ammonium group, and R represents a tetradecyl group (molar ratio between 5a and 5b: 50:50)

Reactive emulsifier 6: a mixture of a reactive emulsifier 6a represented by the general formula (1) in which "n" represents 10, M represents a sodium atom, and R represents an isoundecyl group, and a reactive emulsifier 6b represented by the general formula (1) in which "n" represents 10, M represents a sodium atom, and R represents an isotridecyl group (molar ratio between 6a and 6b: 50:50)

The values for "n" are each an average.

[Preparation of Reactive Emulsifier-Containing Composition]

The reactive emulsifiers 1 to 6 were each loaded into a polypropylene-made Discup so that the mass of the reactive emulsifier-containing composition to be obtained became 1,000 g, and then distilled water was dropped thereto while the resultant was stirred with a homodisper (manufactured by Primix Corporation, DH-25) at a rotation number of 500 rpm, and the mixture was further stirred for 30 minutes. Thus, reactive emulsifier-containing compositions of Examples 1 to 24 and Comparative Examples 1 to 36 were prepared as shown in Tables 1 to 6 below. In Tables 1 to 6, "%" in each of the tables represents mass %.

[Evaluation of pH Stability]

The pH stability of each of the prepared reactive emulsifier-containing compositions of Examples 1 to 24 and Comparative Examples 1 to 36 was evaluated by the following method. Specifically, 100 g of the prepared reactive emulsifier-containing compositions of Examples 1 to 24 and Comparative Examples 1 to 36 were each loaded into a 110 ml screw-capped vial, and its pH was measured with a ph meter (HM-25R manufactured by DKK-TOA Corporation). Subsequently, the reactive emulsifier-containing compositions were each left to stand still in a thermostat chamber at 50° C. for 3 months, and its pH after the still standing was measured. The pH stability of each of the reactive emulsifier-containing compositions was evaluated by using values for the pH before and after the still standing based on the following evaluation criteria for pH stability. The evaluation results are shown in Tables 1 to 6. A result of the evaluation of "o" indicates that the concern about deterioration of the reactive emulsifier is extremely small even after long-term storage.

<Evaluation Criteria for pH Stability>

○ (excellent): The difference between the pH before the still standing and the pH after the still standing was less than 0.5.

x (bad): The difference between the pH before the still standing and the pH after the still standing was 0.5 or more.

[Evaluation of Antiseptic Property]

The antiseptic properties of each of the prepared reactive emulsifier-containing compositions of Examples 1 to 24 and Comparative Examples 1 to 36 for five kinds of microorganisms were evaluated by the following method. Specifically, first, the following five kinds of microorganisms were each cultured at from 25° C. to 37° C. for from 24 hours to 10 days, and were then each diluted with sterilized phosphate-buffered saline to produce a microbial suspension. Then, the microbial suspension was dropped to each of the reactive emulsifier-containing compositions so as to achieve a microbial concentration of from $2.0\times10^6$ CFU/ml to $3.0\times10^6$ CFU/ml, and the resultant was left to stand still at 30° C. for 28 days. After that, the concentration of viable cells was measured. The antiseptic property of each of the reactive emulsifier-containing compositions was evaluated by using the concentration of viable cells after the still standing based on the following evaluation criteria for an antiseptic property. The evaluation results are shown in Tables 1 to 6.

A result of the evaluation of "o" indicates that the proliferation of microorganisms in the reactive emulsifier-containing composition can be sufficiently prevented, and that the reactive emulsifier can be used in various applications even after long-term storage.

<Microorganisms to be Tested>

*Pseudomonas aeruginosa* (bacterium)
*Escherichia coli* (bacterium)
*Candida Albicans* (mold)
*Cladosporium sphaerospermum* (mold)
*Paecilomyces variotii* (fungus)

<Evaluation Criteria for Antiseptic Property>

○ (excellent): All the concentrations of viable cells after the still standing were less than $1.0\times10^4$ CFU/ml.

x (bad): At least one of the concentrations of viable cells after the still standing was $1.0\times10^4$ CFU/ml or more,

TABLE 1

| | | Comparative Example 1 | Comparative Example 2 | Comparative Example 3 | Comparative Example 4 | Example 1 | Example 2 | Example 3 | Example 4 | Comparative Example 5 | Comparative Example 6 |
|---|---|---|---|---|---|---|---|---|---|---|---|
| Reactive emulsifier-containing composition | Reactive emulsifier 1 | 10% | 25% | 45% | 55% | 60% | 80% | 90% | 95% | 99% | 100% |
| | Water | 90% | 75% | 55% | 45% | 40% | 20% | 10% | 5% | 1% | 0% |
| Evaluation result for pH stability | | ○ | ○ | ○ | ○ | ○ | ○ | ○ | ○ | x | x |
| Evaluation result for antiseptic property | | x | x | x | x | ○ | ○ | ○ | ○ | ○ | ○ |

TABLE 2

| | | Comparative Example 7 | Comparative Example 8 | Comparative Example 9 | Comparative Example 10 | Example 5 | Example 6 | Example 7 | Example 8 | Comparative Example 11 | Comparative Example 12 |
|---|---|---|---|---|---|---|---|---|---|---|---|
| Reactive emulsifier-containing composition | Reactive emulsifier 1 | 10% | 25% | 45% | 55% | 60% | 80% | 90% | 95% | 99% | 100% |
| | Water | 90% | 75% | 55% | 45% | 40% | 20% | 10% | 5% | 1% | 0% |
| Evaluation result for pH stability | | ○ | ○ | ○ | ○ | ○ | ○ | ○ | ○ | x | x |
| Evaluation result for antiseptic property | | x | x | x | x | ○ | ○ | ○ | ○ | ○ | ○ |

TABLE 3

| | | Comparative Example 13 | Comparative Example 14 | Comparative Example 15 | Comparative Example 16 | Example 9 | Example 10 | Example 11 | Example 12 | Comparative Example 17 | Comparative Example 18 |
|---|---|---|---|---|---|---|---|---|---|---|---|
| Reactive emulsifier-containing composition | Reactive emulsifier 1 | 10% | 25% | 45% | 55% | 60% | 80% | 90% | 95% | 99% | 100% |
| | Water | 90% | 75% | 55% | 45% | 40% | 20% | 10% | 5% | 1% | 0% |
| Evaluation result for pH stability | | ○ | ○ | ○ | ○ | ○ | ○ | ○ | ○ | x | x |
| Evaluation result for antiseptic property | | x | x | x | x | ○ | ○ | ○ | ○ | ○ | ○ |

TABLE 4

| | | Comparative Example 19 | Comparative Example 20 | Comparative Example 21 | Comparative Example 22 | Example 13 | Example 14 | Example 15 | Example 16 | Comparative Example 23 | Comparative Example 24 |
|---|---|---|---|---|---|---|---|---|---|---|---|
| Reactive emulsifier-containing composition | Reactive emulsifier 1 | 10% | 25% | 45% | 55% | 60% | 80% | 90% | 95% | 99% | 100% |
| | Water | 90% | 75% | 55% | 45% | 40% | 20% | 10% | 5% | 1% | 0% |
| Evaluation result for pH stability | | ○ | ○ | ○ | ○ | ○ | ○ | ○ | ○ | x | x |
| Evaluation result for antiseptic property | | x | x | x | x | ○ | ○ | ○ | ○ | ○ | ○ |

TABLE 5

| | | Comparative Example 25 | Comparative Example 26 | Comparative Example 27 | Comparative Example 28 | Example 17 | Example 18 | Example 19 | Example 20 | Comparative Example 29 | Comparative Example 30 |
|---|---|---|---|---|---|---|---|---|---|---|---|
| Reactive emulsifier-containing composition | Reactive emulsifier 1 | 10% | 25% | 45% | 55% | 60% | 80% | 90% | 95% | 99% | 100% |
| | Water | 90% | 75% | 55% | 45% | 40% | 20% | 10% | 5% | 1% | 0% |
| Evaluation result for pH stability | | ○ | ○ | ○ | ○ | ○ | ○ | ○ | ○ | x | x |
| Evaluation result for antiseptic property | | x | x | x | x | ○ | ○ | ○ | ○ | ○ | ○ |

TABLE 6

| | | Comparative Example 31 | Comparative Example 32 | Comparative Example 33 | Comparative Example 34 | Example 21 | Example 22 | Example 23 | Example 24 | Comparative Example 35 | Comparative Example 36 |
|---|---|---|---|---|---|---|---|---|---|---|---|
| Reactive emulsifier-containing composition | Reactive emulsifier 1 | 10% | 25% | 45% | 55% | 60% | 80% | 90% | 95% | 99% | 100% |
| | Water | 90% | 75% | 55% | 45% | 40% | 20% | 10% | 5% | 1% | 0% |
| Evaluation result for pH stability | | ○ | ○ | ○ | ○ | ○ | ○ | ○ | ○ | x | x |
| Evaluation result for antiseptic property | | x | x | x | x | ○ | ○ | ○ | ○ | ○ | ○ |

[Evaluation of Usability]

The usability of each of the reactive emulsifier-containing compositions in which the content of the reactive emulsifier represented by the general formula (1) in the reactive emulsifier-containing composition is 25 mass %, 45 mass %, 95 mass %, and 100 mass % out of the reactive emulsifier-containing compositions produced in Examples 1 to 24 and Comparative Examples 1 to 36 was evaluated by the following method. Specifically, the reactive emulsifier-containing compositions were each subjected to appearance observation and viscosity measurement at the time of still standing, and the usability of each of the reactive emulsifier-containing compositions was evaluated based on the following evaluation criteria for usability. The evaluation results are shown in Table 7. A result of the evaluation of "o" indicates that the composition can be uniformly and efficiently added when a paint or a coating agent is produced. The viscosity of each of the reactive emulsifier-containing compositions was measured with a cone-plate-type rotary viscometer (TV-20 manufactured by Toki Sangyo Co., Ltd.) under the condition of 25° C. at a rotation number of 10 rpm.

<Evaluation Criteria for Usability>

○○ (excellent): The appearance was a uniform liquid, and the viscosity was 10,000 mPa·s or less, ○ (good): The appearance was a uniform liquid, and the viscosity was more than 10,000 mPa·s and 100,000 mPa·s or less.

x (bad): The appearance was a gel or a solid, and/or the viscosity was more than 100,000 mPa·s.

TABLE 7

| | Appearance | Viscosity (mPa · s) | Evaluation results for usability |
|---|---|---|---|
| Comparative Example 2 | Uniform liquid | 20 | ○○ |
| Comparative Example 3 | Nonuniform gel | >100,000 | x |
| Example 4 | Uniform liquid | 1,200 | ○○ |
| Comparative Example 6 | Uniform liquid | 7,200 | ○○ |
| Comparative Example 8 | Uniform liquid | 20 | ○○ |
| Comparative Example 9 | Nonuniform gel | >100,000 | x |
| Example 8 | Uniform liquid | 1,300 | ○○ |
| Comparative Example 12 | Uniform liquid | 10,000 | ○○ |
| Comparative Example 14 | Uniform liquid | 20 | ○○ |
| Comparative Example 15 | Nonuniform gel | >100,000 | x |
| Example 12 | Uniform liquid | 1,000 | ○○ |
| Comparative Example 18 | Pale-yellow solid | Unmeasurable | x |
| Comparative Example 20 | Uniform liquid | 20 | ○○ |
| Comparative Example 21 | Nonuniform gel | >100,000 | x |

TABLE 7-continued

| | Appearance | Viscosity (mPa · s) | Evaluation results for usability |
|---|---|---|---|
| Example 16 | Uniform liquid | 4,000 | ○○ |
| Comparative Example 24 | Uniform liquid | 34,000 | ○ |
| Comparative Example 26 | Uniform liquid | 20 | ○○ |
| Comparative Example 27 | Nonuniform gel | >100,000 | x |
| Example 20 | Uniform liquid | 2,500 | ○○ |
| Comparative Example 30 | Uniform liquid | 6,000 | ○○ |
| Comparative Example 32 | Uniform liquid | 20 | ○○ |
| Comparative Example 33 | Nonuniform gel | >100,000 | x |
| Example 24 | Uniform liquid | 3,000 | ○○ |
| Comparative Example 36 | Uniform liquid | 13,000 | ○ |

From the above-mentioned results, it was shown that the reactive emulsifier-containing composition of the present invention was excellent in pH stability and antiseptic property, and was able to be stably stored for a long period of time without any risk of deterioration of its characteristics as a reactive emulsifier even at the time of long-term storage. Further, it was shown that the reactive emulsifier-containing composition of the present invention was also excellent in usability.

The invention claimed is:

1. A reactive emulsifier-containing composition, comprising:

a reactive emulsifier represented by the following general formula (1); and water, wherein a content of the reactive emulsifier represented by the general formula (1) in the reactive emulsifier-containing composition is from 60 mass % to 98 mass %:

(1)

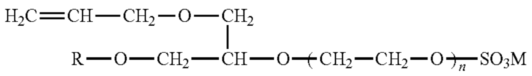

where R represents a hydrocarbon group having 8 to 20 carbon atoms, "n" represents a number from 5 to 50, and M represents a hydrogen atom, an alkali metal atom, or an ammonium group.

2. The reactive emulsifier-containing composition according to claim 1, wherein a content of the water is from 2 mass % to 40 mass %.

3. The reactive emulsifier-containing composition according to claim 1, wherein a mass ratio between the content of the reactive emulsifier represented by the general formula (1) in the reactive emulsifier-containing composition and a content of the water therein is from 60:40 to 98:2.

4. A method of storing a reactive emulsifier, comprising mixing a reactive emulsifier represented by the following general formula (1) with water and then leaving the mixture to stand still, wherein a content of the reactive emulsifier in a reactive emulsifier-containing composition comprising the reactive emulsifier and the water is from 60 mass % to 98 mass %:

(1)

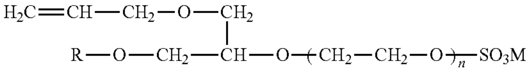

where R represents a hydrocarbon group having 8 to 20 carbon atoms, "n" represents a number from 5 to 50, and M represents a hydrogen atom, an alkali metal atom, or an ammonium group.

5. The method according to claim 4, wherein a mass ratio between the content of the reactive emulsifier represented by the general formula (1) in the reactive emulsifier-containing composition and a content of the water therein is from 60:40 to 98:2.

6. The reactive emulsifier-containing composition according to claim 2, wherein a mass ratio between the content of the reactive emulsifier represented by the general formula (1) in the reactive emulsifier-containing composition and a content of the water therein is from 60:40 to 98:2.

* * * * *